INVENTOR
G. H. MYERS
BY [signature]
ATTORNEY

INVENTOR
G. H. MYERS
BY [signature]
ATTORNEY

Sept. 27, 1960 G. H. MYERS 2,954,165

CYCLIC DIGITAL DECODER

Filed April 20, 1956 4 Sheets-Sheet 3

INVENTOR
G. H. MYERS
BY [signature]
ATTORNEY

Sept. 27, 1960 G. H. MYERS 2,954,165

CYCLIC DIGITAL DECODER

Filed April 20, 1956 4 Sheets-Sheet 4

INVENTOR
G. H. MYERS
BY [signature]
ATTORNEY

United States Patent Office 2,954,165
Patented Sept. 27, 1960

2,954,165

CYCLIC DIGITAL DECODER

George H. Myers, Mount Vernon, N.Y., assignor to Bell Telephone Laboratories, Incorporated, New York, N.Y., a corporation of New York Filed Apr. 20, 1956, Ser. No. 579,516

13 Claims. (Cl. 235—154)

This invention relates to digital decoding, and particularly to digital decoding means for numbers supplied in the form of pulse code groups.

In order to achieve greater accuracy than is possible with analog computing techniques, feedback control systems have been developed wherein all computation is performed by digital devices. The copending application of J. J. J. Kernahan and J. C. Lozier, Serial No. 473,829, filed December 8, 1954, now Patent No. 2,775,727, and assigned to applicant's assignee is illustrative of systems of this kind. In such arrangements a digital control signal is provided in the form of successive groups of discrete voltage pulses of uniform amplitude and duration, an equal time interval being assigned to each group. Each pulse in such a pulse group represents a digit in a preassigned numerical permutation code, the relative position of all pulses in the group together representing a number in that code. Each such code number has a decimal number equivalent, or decimal "value," determined by the relationship between the code involved and the decimal number system. To utilize such a digital control signal for controlling a motor, or a voltmeter, or any other voltage responsive device such as would be employed at some stage in a complete control system, it is necessary to interpose decoding or translating means to derive the decimal values of the successive code groups in the digital control signal and to produce therefrom voltages which, either in amplitude or duration, are proportioned to the successive decimal values so derived. The copending application referred to discloses such means wherein as each code group in a digital control signal is received the code number it represents is reduced toward zero in discrete steps of uniform amounts, so that the time interval required to reach zero is proportional to the decimal value of the code group. Switching means are operated so as to apply a constant amplitude voltage to a servo motor during that time interval, the motor thereby rotating an output shaft toward a position dictated by the control signal. While this arrangement results in a highly accurate and reliable control loop, a decoder constructed in accordance with the instant invention permits a still further improvement in the accuracy and speed of response of the loop.

One of the characteristics of any feedback control loop is a tendency to oscillate if the rate at which discrete control data is supplied to it is not sufficiently high relative to the natural frequency of oscillation of the loop. A rough rule of thumb for loop stability is that the natural frequency must be at least five times the frequency at which successive control signal pulse code groups are supplied. Since the latter frequency is limited by the maximum operating speed of the digital computing device which provides the coded control signal, a typical computing speed being approximately ten cycles per second, the control loop must be designed to have a relatively low natural frequency. This will result in a relatively long response time, causing a serious phase lag between the actual position of a controlled device and the desired position toward which it is directed.

A further problem involved in designing rapidly responsive control systems wherein control data is supplied at discrete intervals is that in order to maintain control of the system during each such interval the data must be stored so as to be continuously available until new data arrives in the succeeding interval. Hence, auxiliary storage means are often required, with concomitant expense and complexity.

An object of the instant invention is to provide decoding means for deriving from a group of pulses which represent a decimal value in accordance with a predetermined permutation code a multiplicity of rapidly recurring voltages of which each has a duration proportional to that decimal value.

A further object is to provide means for repetitively decoding each of successive pulse code groups at a rapid rate.

A further object is to provide means whereby an applied pulse code group may be decoded, reproduced, and decoded again at a rapid cyclic rate without use of means for storing the applied code group.

One embodiment of a decoder constructed in accordance with the invention comprises a subtracting unit, a recirculatory loop connecting the output of that unit to its input, and a control unit. Inasmuch as digital computing devices operate most efficiently in binary code, the subtracting unit is adapted to receive at its input a group of pulses representing in binary code a control number to be decoded and to produce at its output a new group of pulses representing in binary code the control number reduced by the binary digit "one" in the least significant place. This new code group is returned to the input of the subtracting unit through the recirculatory loop and the same process is repeated. After a time interval dependent on the magnitude of the input number, the code group produced at the output of the subtractor will represent the binary number zero. The process is nevertheless continued, thereby producing a series of output code groups representing numbers of opposite arithmetic sign from the control number. After a definite number of such cyclic subtractions there will emerge from the recirculatory loop a code group the same as that initially applied to the subtracting unit. Hence, the decoding process regenerates the control number without use of any auxiliary storage devices. The regeneration of the control number constitutes one complete cycle of operation of the decoder, and this cycle is continuously repeated at a rapid rate. The control unit detects the arithmetic sign of the control number, which may be represented by the presence or absence of a pulse in a particular position in the code group which represents it, each time that group is regenerated. If the sign is positive, the control unit begins producing a constant positive output voltage. If the sign is negative, it does not produce any output voltage. The control unit also detects the instants at which the output code group produced by the subtracting unit represents the binary number zero. At those times, if a positive output voltage had previously been initiated, the control unit turns it off; while if no output voltage had already existed the control unit begins producing a constant negative voltage. Consequently, the decoder produces a series of output voltages of which each has a duration proportional to the decimal value of the control number to be decoded and a polarity determined by the arithmetic sign of that number. If the control number to be decoded is zero, no output voltage is produced at all. Hence, a perfect zero decoding is attained, permitting highly accurate stabilization of any servo loop in which the decoder may be utilized.

Other objects and features of the invention appear in the following detailed description and accompanying drawings, in which.

Figure 1:
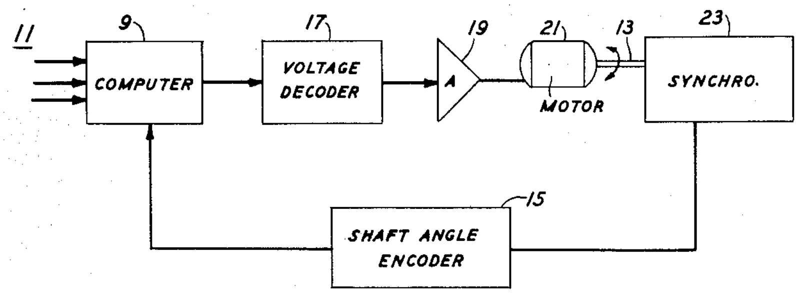
Fig. 1 is a block diagram of a feedback control system showing generally how a decoder constructed in accordance with the invention may be utilized in such a system.

As shown in Fig. 1, a digital computer 9 receives information from external sources shown schematically by arrows 11, and calculates the desired position of output shaft 13. It also receives from shaft angle encoder 15 a pulse code group having a decimal value proportional to the actual position of shaft 13, and produces a control pulse code group having a decimal value representing the decimal number of degrees of error in shaft position. This control (or error) signal is applied to decoder 17, the subject of the invention, which produces therefrom a series of voltages of constant amplitude and each of a duration proportional to the decimal value represented by the control pulse code group. These voltages are applied through an amplifier 19 to a servo motor 21, causing it to rotate shaft 13 in a direction which reduces the error in its position. For large errors the decimal value of the control pulse group will be large and the decoded voltages which actuate motor 21 will be correspondingly long, causing it to accelerate shaft 13 rapidly. As the positional error is reduced, the resultant decoded voltages applied to motor 21 will be shorter, and shaft 13 will be rotated at a lesser rate. It will come to rest when computer 9 produces a control pulse code group having the valve zero, indicating that the actual shaft position is as required by the computer. A synchro 23 coupled to shaft 13 generates a voltage of which the decimal amplitude is proportional to the angular position of the shaft at every instant. This voltage is applied to shaft angle encoder 15, which converts it into the digital pulse code form suitable for application to computer 9.

While it is the position of shaft 13 which is controlled, the accuracy of the positioning is dependent on proper control of the rotational speed of motor 21. When the positional error is large the motor should operate at high angular velocities, while as the error approaches zero it should operate at decreasing angular velocities. Any other motor control characteristic would result in decreased speed of shaft position error correction or cause excessive oscillation of the shaft about the desired position. Since the speed of motor rotation depends on the magnitude rather than the duration of the voltage applied, it is evident that the important factor in controlling shaft 13 is the magnitude of the voltage applied to motor 21.

Suppose that in response to each pulse code group decoder 17 produced a single voltage of constant amplitude and of a duration corresponding to the code value. This duration could be converted into a corresponding voltage amplitude by deriving the time integral of the pulse. A suitable filter could be used to perform this integration, but for accurate performance it would need to have a time constant at least ten times the duration of the pulse to be integrated. A filter having such a long time constant would greatly reduce the overall response time of the control system.

In accordance with the invention, however, this situation is avoided by virtue of the fact that decoder 17 produces many rapidly recurring voltages rather than only one voltage in response to each pulse code group to be decoded. All of these decoded voltages are equal in magnitude and in duration, the duration being proportional to the particular code value. If "$n$" such pulses are produced during the interval between successive code groups, each voltage will have a duration $1/n$th as large as that interval. Hence, the time constant of an integrating filter interposed between decoder 17 and motor 21 may only $1/n$th as large as the value that would be required if only a single voltage had been produced in the same interval. The speed of loop response will therefore be increased by a factor "$n$." With an eight pulse binary code, and if computer 9 produces a new pulse code group every one-tenth second, a value of "$n$" nearly equal to fifty is easily achieved. In addition, with this greatly reduced value of required time constant an actual filter circuit is not required. The normal time delay introduced by the windings of servo motor 21 will be adequate to provide the desired voltage integration to a high degree of accuracy.

Figure 2A:
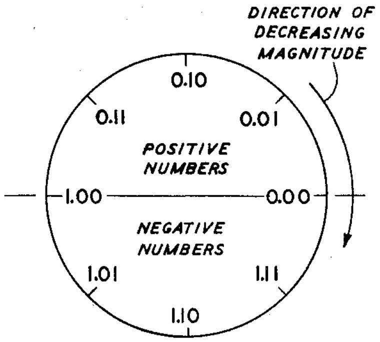
Fig. 2A is a chart of the numerical operations utilized in accordance with the invention for decoding binary pulse code groups.

The numerical principles of the invention may be understood by referring to Fig. 2A. This is a chart drawn for a binary number system in which all numbers lie between plus one and minus one. Negative numbers are represented by their true complements (two minus the number), so that they are recognized by the presence of a "1" in the most significant position. Each possible digital position is called a "binary place," and each binary place is occupied by either a "1" or a "0." The "1's" and "0's" constitute the "bits" of the number, the chart being drawn for an accuracy of three binary places. The maximum positive and the maximum negative number in such a number system are each represented by 1.00, the true complement of minus one in the binary number system being plus one. All numbers may therefore be represented by points on a number circle on which, since 1.00 is furthest removed from 0.00, it is placed diametrically opposite the 0.00 point. The halves of the circle separated by this diameter separately comprise all possible negative and positive numbers. In a digital number system the minimum change in any number is one bit more or less in the least significant place. With three significant places this is 0.01, so the only possible positive numbers in addition to 1.00 are as plotted on the upper half of the number circle. Since the decimal fraction value of 0.01 is ¼, the decimal fraction values of these numbers are ¼, ½ and ¾.

It is seen that in proceeding from any positive number toward "0" it is necessary to pass through numbers of continually decreasing magnitude. This corresponds to repeated subtraction of a "1" bit from the least significant bit of any chosen positive number on the circle until zero is reached. If the process be continued at zero, the first number produced will have the smallest negative decimal fraction value. Using the complement notation, it is therefore represented by the largest possible binary number, or 1.11 in the number system illustrated. This result is obtained by subtracting 0.01 from 0.00, producing a borrow in the most significant place of the minuend which gives rise to a "1" in the most significant place of the difference. If the process is again repeated, subtracting 0.01 from the difference already obtained, the new difference will be 1.10. A third subtraction operation as described will yield a third difference number 1.01. These three difference numbers comprise all the possible negative numbers besides 1.00. It is therefore apparent that except at the single point 0.00, in going around the number circle in one direction successive numbers, both positive and negative, are successively smaller. For the reverse direction successive numbers are successively larger. Even at 1.00, since that is both the largest positive and also the largest negative number, the next number obtained by subtracting a "1" bit from the least significant bit is smaller. A borrow in the most significant place can occur only in passing from a smaller number to a larger number, and since this situation exists only at the "0" point that is the only point on the circle at which such a borrow will be obtained.

The presence of only a single binary number at which subtraction of a "1" from the least significant bit will produce a borrow in the most significant binary place is a key feature of the operation of the invention. It provides a definite indication of when the repetitive subtraction operation has reduced any initial number, positive or negative, to that magnitude. In many number systems, unlike that described, the maximum negative number is smaller than the maximum positive number. For example, in a decimal number system where all numbers lie between plus and minus ten, the complement of minus ten is zero. Subtracting a "1" from the maximum negative number will therefore result in a borrow. Likewise, a borrow is produced in subtracting a "1" from the zero at the positive end of the number circle. Such number systems are therefore not adapted to utilization of the occurrence of a borrow in the most significant place as a time marker.

A borrow in the most significant place must always occur at zero, this being the smallest possible number in any number system. To assure that no such borrow occurs at any other number it is necessary that successive numbers continuously decrease when passing sequentially from the negative number closest to zero, to the smallest negative number, to the largest positive number, and back to zero. Since addition of the smallest least significant digit to the maximum number representable in a given number of digital places in any number system results in a number having zeros in all those places, the resultant number being known as the modulus of the system, zero represents the modulus as well as the smallest possible number. Since the quantities of positive and negative numbers are equal in a continuous number system, it follows that the stated requirement can be achieved by making the maximum positive and maximum negative numbers each equal to half the modulus. Any number system for which this is true will be adapted for use in accordance with the invention. If the modulus is also the radix of the number system, the stated requirement is that the maximum positive and negative numbers be each equal to half the radix.

An additional characteristic of the number system represented in Fig. 2A is that the process of repeated subtraction of a "1" from the least significant bit of any initial number evidently results in a complete traverse of the number circle and regeneration of the initial number. As illustrated, eight such subtractions complete one full cycle from any number back to that number. If the subtractions recur repeatedly, every eighth subtraction will mark the instant at which a complete cycle has been traversed. This feature of the number system may be characterized by referring to the system as being cyclic. If each such subtraction occurs in the same time, the time to go from any number around the circle back to the same number will be constant.

Figure 2B:
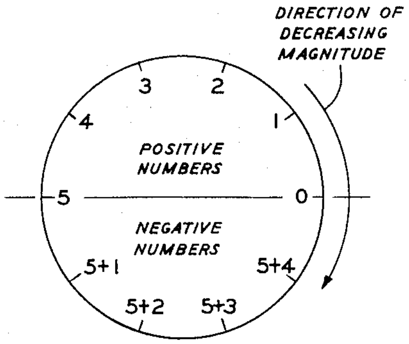
Fig. 2B being a similar illustration for decoding pulse groups in another type of numerical permutation code.

While the arithmetic principles of the invention are illustrated in Fig. 2A in connection with a binary code, the same principles are applicable to a wide variety of digital codes. The important requirements are that the number system be cyclic and that all numbers successively decrease in magnitude in proceeding through all possible numbers in a given direction from any starting number except when passing through a singular number which in Fig. 2A is zero. Fig. 2B shows a chart similar to that of Fig. 2A, but using a decimal digital code. The radix is ten, and all numbers lie between plus five and minus five. Negative numbers are represented in complement form, and are shown as 5 plus the appropriate integer to emphasize the fact that all negative numbers have a magnitude of 5 or more. No borrow is produced in the most significant place when proceeding through the point marked 5 on the number circle of Fig. 2B in the direction of decreasing magnitude. Only at the zero point is such a borrow produced, since only there does an increase in magnitude occur in proceeding in the indicated direction around the number circle.

Figure 3:
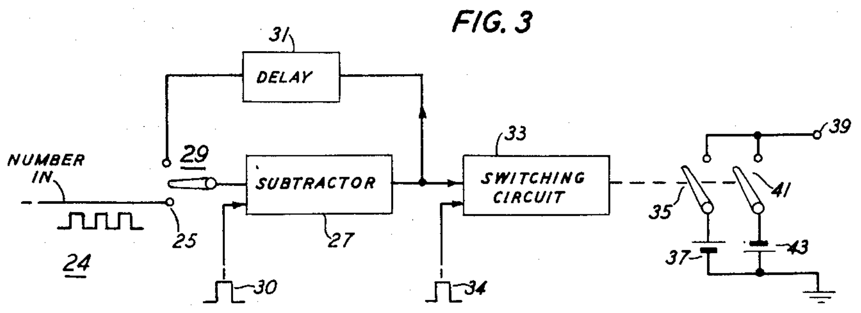
Fig. 3 is a block diagram illustrating the functional relationships involved in a decoder constructed in accordance with the invention.

Fig. 3 shows in block form the functional arrangement of a decoder constructed in accordance with the invention. This will be described, by way of example, on the basis that the decoder operates in accordance with a binary code having three significant binary places. This will correspond with the number chart of Fig. 2A. A control binary pulse code group 24 is applied to input terminal 25. These pulses occur serially, in the order of increasing code significance. A digital subtractor 27 is connected via switch 29 to terminal 25, and is supplied with a pulse 30 serving as a binary subtrahend. This is a single pulse timed to occur simultaneously with application of the first or least significant pulse in code group 24 to subtractor 27. Subtractor 27 therefore produces a binary code group representing the input number reduced by a "1" in the least significant place. After all pulses in code group 24 have entered the subtractor, switch 29 is disconnected from terminal 25 and instead connected to the output of a delay line 31 through which the output of the subtractor may be reapplied to its input after a delay greater than the length of the code group. Subtrahend pulse 30 is timed to recur at intervals equal to the time between application of a code group to the input of subtractor 27 and reappearance at the input of the first pulse produced by the subtractor. It is therefore evident that a continuous subtractive loop is established, comprising subtractor 27 and delay line 31. Each traverse of the subtractive loop corresponds to movement to the next number on the chart of Fig. 2A in the clockwise direction, starting from the number corresponding to the input code group.

A switching circuit 33 connected to the subtractive loop detects the occurrence of a borrow in the most significant binary position of the code group leaving subtractor 27. As explained above with reference to Figs. 2A and 2B, this occurs when the code group which had last entered the subtractor represented the number "0." In addition, a decode cycle pulse 34 is applied to switching circuit 33 simultaneously with the most significant pulse in the code group produced by subtractor 27 immediately following application of control code group 24 to the subtractor. Cycle pulse 34 enables switching circuit 33 to detect whether this pulse represents a "1" or a "0." If it is a "0," as would be true if control code group 24 represents a positive number, switching circuit 33 closes a switch 35 which connects a source of positive voltage 37 to output terminal 39. This condition persists until the code group entering the subtractor has been reduced to "0." Switching circuit 33 detects this event and opens switch 35, thereby disconnecting source 37. By the time the code group emerging from subtractor 27 is the same as it was immediately after application of control code group 24 to the subtractor due to the repetitive subtraction operation described above, another cycle pulse 34 occurs and switching circuit 33 again connects source 37 to load 39. The entire process continues cyclically until switch 29 is operated to open the subtractive loop.

If the most significant pulse in the code group emergent from subtractor 27 immediately following application of control code group 24 thereto represents a "1," as would be the case when the number represented thereby is negative, switching circuit 33 will allow an already open switch 41 to remain open so that a source of negative voltage 43 connected to that switch is maintained disconnected from terminal 39. Thus no voltage is applied to that terminal until the code group entering subtractor 27 has been reduced to "0." Then, switching circuit 33 closes switch 41 connecting source 43 to terminal 39. This condition persists until the code group emerging from subtractor 27 is the same as it had been immediately after control code group 24 was applied thereto, when switching circuit 33 again disconnects switch 41. This process will cyclically continue until switch 29 is operated to open the subtractive loop.

Cycle pulse 34 must be timed to recur at intervals equal to the time for the subtractive loop to regenerate the control code group 24 which originally was applied to the loop. As explained above, for the number system of Fig. 2A this is the time to complete eight subtractive operations. In addition, cycle pulse 34 must occur a fixed time after the instant of application of control code group 24 to subtractor 27, since it must be concurrent with the most significant bit of the code group produced by subtractor 27 after the first subtraction following that instant.

Figures 4A, 4B:
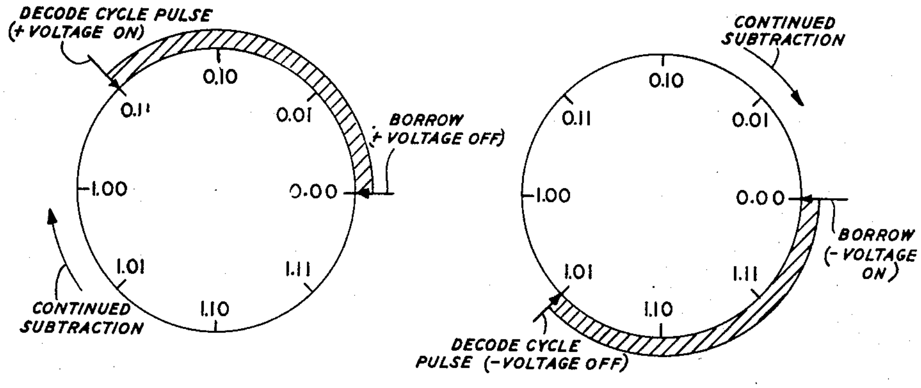
Figs. 4A and 4B are charts which relate the operation of a decoder constructed in accordance with the invention to the described numerical operations.

Fig. 4A is a chart relating the operation of the decoder of Fig. 3 to the arithmetic process described above with reference to Fig. 2A. For this explanation it will be assumed that a control pulse code group representing the binary number 0.11 is to be decoded. The fact that the most significant bit is a "0" indicates that the number is positive. As a result, when decode cycle pulse 34 occurs a positive voltage is applied to output terminal 39. The subtraction operation repeats cyclically, reducing the number in the subtractive loop to "0" after three successive subtractions. When this occurs, switching circuit 33 detects a borrow in the most significant place of the number leaving subtractor 27 and removes the positive voltage from terminal 39. It is evident from Fig. 4A that the time during which positive voltage is applied to output terminal 39 is proportional to the decimal value of the control pulse code group. The subtraction process continues, and the beginning of every eight successive subtractions marks the instant at which the control pulse code group has again been regenerated. The decode cycle pulse 34, which occurs at these instants, then causes the entire process to repeat.

Fig. 4B shows the arithmetic process occurring in the decoder of Fig. 3 when the number to be decoded is negative, for example 1.01. The fact that the most significant bit is a "1" causes switching circuit 33 to disconnect negative voltage source 43 from terminal 39 every time cycle pulse 34 occurs. The subtraction operation repeats cyclically and after five subtractions reduces the number in the subtractive loop to zero. The borrow pulse which then occurs actuates switching circuit 33 to connect source 43 to terminal 39. This persists until the third following, or eighth subtraction, when the control pulse code group is regenerated. The next cycle pulse, which is synchronized to occur at that instant, then causes switching circuit 33 to again disconnect source 43 from terminal 39. As shown in Fig. 4B, the time during which negative voltage is applied to the output load is the complement of the time during which positive voltage would have been applied if the number represented by the control pulse code group had been positive. The reason for this is apparent from the number circles in Figs. 4A and 4B. For a positive number, the time to go in the clockwise (decreasing) direction from the number to zero is proportional to the decimal value of the number. For a negative number however, since such numbers are represented by their complements, the more negative it is the smaller it will be. Hence, it is the time to go from zero to the complement which is proportional to the decimal value of the number.

Figure 5:
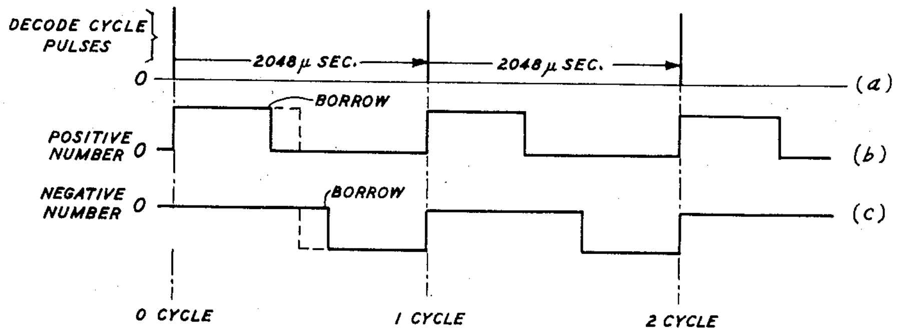
Fig. 5 is a diagram of the time relationships between various pulse code groups utilized in and produced by a decoder constructed in accordance with the invention.

Fig. 5 shows the time relationships involved in the decoder of Fig. 3. Waveform (*a*) shows the decode cycle pulses, which occur every eight subtraction times. Waveform (*b*) depicts the voltage produced between terminal 39 and ground when the number to be decoded is positive. This waveform is drawn for a number having the decimal value of +¾, binary value 0.11. As shown, this voltage consists of a series of positive pulses each of which is initiated by a cycle pulse and lasting until a borrow pulse occurs in the most significant binary place of the number emerging from the subtractor. The maximum positive number which the decoder may be called upon to handle is 1.00, which requires four subtraction cycles to reduce to zero. Hence, the maximum possible duration of any pulse is one-half of the time interval between successive cycle pulses. The shape of the maximum possible pulse would therefore be extended as shown by the dotted lines appended to the first pulse in waveform (*b*). The pulse in waveform (*b*) is ¾ as long as the maximum. Waveform (*c*) shows the voltage which would exist between terminal 39 and ground if a negative number were to be decoded. The waveform has been drawn for a number having a decimal value −¾, binary value 1.01. This consists of a series of negative pulses each initiated by a borrow pulse of the kind described and terminated by the next cycle pulse. Since the maximum negative number is −1, which requires four subtraction operations to reach from zero, the maximum possible duration of any negative pulse is one-half the interval between cycle pulses. The shape of the maximum possible negative pulse is therefore that of the first pulse shown in waveform (*c*) extended as indicated by the dotted lines. The pulse in waveform (*c*) is ¾ as long as the maximum.

In a typical decoder constructed in accordance with the preceding description, successive control binary pulse code groups are supplied every one-tenth second. The control pulse code groups are applied in serial form, the pulse representing the least significant bit arriving first, and each pulse following its predecessor at an interval of one microsecond. A complete control code group, or binary number, consists of eight bits. As a matter of convenience, a binary "1" is represented by the presence of a pulse in the appropriate binary position and a "0" by the absence of such a pulse. Since it is desirable in computer systems to limit the maximum number representable to unity, the binary point may be shifted to the left of the largest binary number to be represented. The maximum number of permutations available remains $2^8-1$, but the maximum binary number becomes $$\frac{2^8-1}{2^8}$$

Since each pulse code group represents a binary number, the individual pulses in the group representing its bits, reference will be made hereinafter in this specification to "numbers" and "bits" rather than to the pulse groups and pulses by which they are represented.

The subtractor utilized in the typical decoder described will complete the subtraction of a "1" from the least significant bit of any incoming number in eight microseconds. Since a subtraction operation is required in order to detect when the number entering the subtractor is zero, a maximum of $2^8$ subtraction operations are required to complete a single decoding cycle. Hence, $8\times2^8=2048$ microseconds must be allowed for each decoding cycle. Since about one-tenth second is available before a new input number arrives to be decoded, each input number may be decoded up to forty-eight times. In Fig. 5 there would be 48 decoded pulses in each of the waveforms shown. As explained previously, a feedback control loop including a decoder of this kind may therefore have a response time only one-forty-eighth of that which would be necessary if only a single decoded pulse having a duration of up to 2048 microseconds were produced for each number to be decoded.

Figure 6:
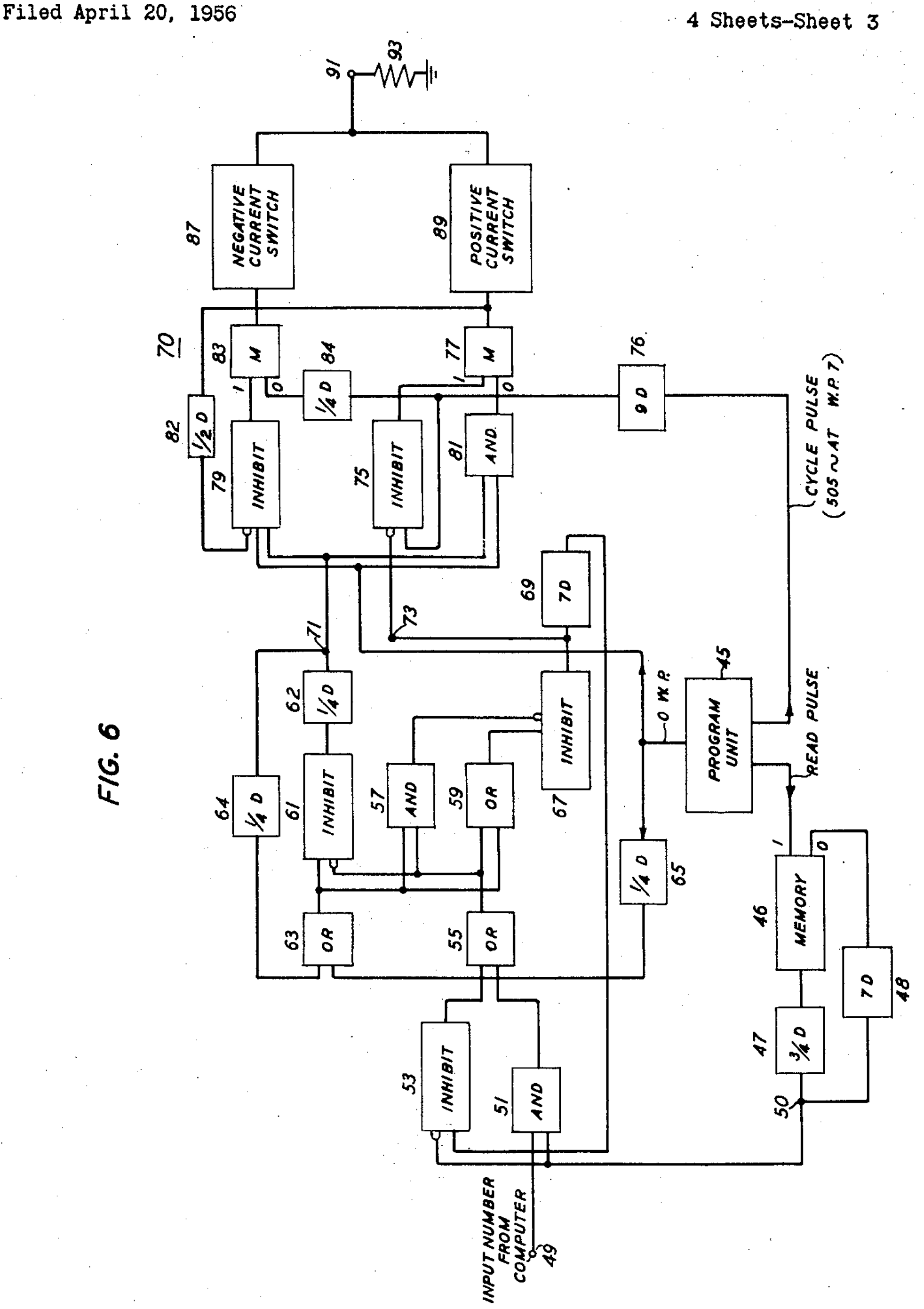
Fig. 6 is a logic circuit diagram of an illustrative embodiment of the invention.

Fig. 6 is a logic block diagram illustrating in detail a specific embodiment of a decoder constructed in accordance with the invention. This utilizes unit circuits which perform certain logic functions, as follows:

"AND"—This circuit produces an output pulse only when a pulse is present simultaneously at each of its input terminals. In the absence of this condition the unit blocks any pulse applied to any input terminal.

"OR"—This circuit will produce an output pulse if a pulse is present at one or more of its input terminals.

"Inhibit"—This circuit produces an output pulse only if a pulse is present simultaneously at all of its input terminals and no pulse is present at its blocking terminal. The blocking terminal is denoted by a semicircle. A pulse at the blocking terminal precludes production of an output pulse from the unit regardless of the conditions existing at the other input terminals.

"Memory"—This circuit has a "set 1" and a "set 0" input terminal. It produces a continuous train of output pulses in response to application of one or more pulses to the set 1 terminal. A pulse on the set 0 terminal stops production of output pulses. No output pulse is produced if pulses are simultaneously applied to both input terminals.

"Delay"—This circuit, symbolized by a box containing the letter "D," delays an entering pulse by a time interval equal to a particular number of bit times. The number of bit times of delay are indicated by the number preceding the letter "D." Each of the four logic elements noted above also introduces a delay of one-quarter of a bit time.

While many specific circuits performing these logic forms are well known, a satisfactory set is disclosed in the article "Regenerative Amplifier for Digital Computer Applications," by J. H. Felker, appearing on pages 1584 through 1596 of the November 1952 issue of the "Proceedings of the Institute of Radio Engineers," volume 40, number 11. As disclosed in that article, a pulse regenerator to maintain the proper shape and timing of all pulses is an important part of these logic circuits. The specific pulse regenerator circuit shown in the article operates satisfactorily and may be used. Alternatively, an improved version of the regenerator which appears in Mr. Felker's copending application Serial No. 376,923, filed August 27, 1953, and assigned to applicant's assignee may also be used.

The circuit of Fig. 6 accepts binary input numbers from a digital computer (not shown) in serial form, the least significant bit first and the others in succession. The unit of time measurement is the "bit time," this being the duration of each bit. As stated above, this may be one microsecond. Since the relative positions (denominational orders) of the bits in any code group or word determine their binary code values, precise timing of all operations is essential. This timing is performed by program unit 45. This unit would normally be part of the digital computer connected to the decoder. If not, it must operate at the same rate as and in synchronism with the program unit of the computer itself. As is conventional in digital computers, program unit 45 may include a master oscillator and several counters. These may include high and low speed ring counters, with the low speed ring counter advancing one step for each full count of the high speed ring counter. In addition, one full counting cycle of the low speed counter may correspond to the interval between production of successive input numbers to be decoded. Program unit 45 controls the pulse regenerators referred to above which are part of all the logic circuits, thereby maintaining the time between successive bits in any word at one microsecond.

The point of reference for time measurement is the counting cycle of the counters in the program unit. For an eight bit binary code a fundamental series of pulses produced by the program unit consists of a pulse every eight bit times. This pulse is denoted the "zero word pulse," and the time at which it occurs is called zero bit time. From this standard pulse series are derived various other series of word pulses each having an eight bit time period. The series lagging the zero word pulse by M bit times is called word pulse "M," abbreviated W.P. M, and is said to occur at bit time M. Many operations of the decoder are controlled by particular word pulses from the program unit, and so are repeated every eight bit times. Consequently, in coordinating the times of occurrence of various decoder operations the zero bit time is identical with the eighth, sixteenth, etc., bit times. In cases where one operation occurs during a given word pulse cycle and is coordinated with another occurring in a later cycle, it may be convenient to talk of bit times exceeding 8. However, such times are the same as the remainder of a factor of 8 bit times insofar as their relation to cyclic operations of the decoder are concerned. The program unit may also include certain AND units which make available special pulses having a repetition period other than eight bit times, such as the cycle pulses referred to previously. These pulses have a repetition interval of $2^8$ bit times, but occur simultaneously with a selected word pulse. Another special pulse required by the decoder is a read pulse, described further below. Its repetition rate is determined by the computer operating speed.

When the computer (not shown) is about to produce a number to be decoded, program unit 45 generates a "read pulse" one bit time in advance and at W.P. 7. If program unit 45 is part of the computer this does not raise any problem, since all computer operations are timed by its program unit. If not part of the computer, the computer program unit may provide a pulse to the decoder program unit in advance of the production of a number by the computer, so the latter unit can produce the read pulse described. The read pulse is applied to the set 1 terminal of a Memory unit 46, which begins producing a train of pulses. The output terminal of Memory unit 46 is connected to a three-fourths bit time Delay unit 47. Since there is a delay of one-fourth bit time in Memory unit 46, the first pulse produced by that unit emerges from Delay unit 47 at bit time 8. The output terminal 50 of Delay unit 47 is connected back to the set 0 terminal of Memory unit 46 through a seven bit time Delay unit 48. Hence, the first pulse from Memory unit 46 sets that unit back to the zero state at bit time 15. Consequently, Memory unit 46 produces a series of eight pulses, from bit time 8 to bit time 15, at output terminal 50. This terminal may be considered the gating terminal of the entire circuit of Fig. 6, and will be so identified hereinafter. In addition, the pulses generated there, as described, will be identified as gating pulses. The bit times of these gating pulses, as explained above, may be considered to be bit times 0 and 7 insofar as their time position in the decoder operating cycle is concerned. In the interest of brevity, reference to particular bit times will hereinafter be denoted by the letter "T" followed by the number of the bit time.

The first of the eight bits in the input number to be decoded arrives at decoder input terminal 49 from the computer simultaneously with W.P. 0, following production of the read pulse by program unit 45. As will be more clearly understood from the following description, the read pulses must occur at a rate which is an integral multiple of the time of one decoding cycle to permit the decoder to complete a full decoding cycle before a new number is applied for decoding. Hence, it is desirable and convenient to program the computer to produce successive numbers to be decoded at intervals that are integral multiples of that time. With the assumed operating rates mentioned above, the latter time is 2048 microseconds. This relation between read pulses and decoding rate is not an inherent requirement of the invention, however, since use of a buffer register as described below permits divorcing the computer program rate from the decoding rate.

Input terminal 49 is connected to one input terminal of an AND unit 51. The other input terminal of the latter unit is connected to gating terminal 50, and so receives eight pulses from T0 to T7. Hence, the input number applied to terminal 49 passes through AND unit 51. Terminal 50 is also connected to the blocking terminal of an Inhibit unit 53. The output of the latter unit and that of AND unit 51 are applied to individual input terminals of an OR unit 55. Hence, when an input number is entering the decoder it alone is conveyed to OR unit 55 and any number reaching Inhibit unit 53 is blocked. Conversely, when no input number is entering the decoder, AND unit 51 is blocked but Inhibit unit 53 will pass any number reaching it to the input of OR unit 55. Since a gating pulse train from terminal 50 is always applied to AND unit 51 and Inhibit unit 53 whenever an input number is applied to terminal 49, it is evident that these units serve as a switch. The pulse train actuates the switch to admit input numbers to OR unit 55 and prevents any recirculated numbers from reaching that unit. When not actuated, the switch isolates the computer from the decoder and permits recirculated numbers to reach OR unit 55 by way of Inhibit unit 53.

The output of OR unit 55 is connected to one input terminal of an AND unit 57 and one input terminal of an OR unit 59, and also to the blocking terminal of an Inhibit unit 61. The output terminal of another OR unit 63 is connected to the input terminal of Inhibit unit 61 and also to the other input terminals of AND unit 57 and OR unit 59. The output terminal of Inhibit unit 61 is connected through a feedback loop including one-quarter digit time Delay units 62 and 64 to one input terminal of OR unit 63. The other input terminal of the latter unit is supplied with a zero word pulse from program unit 45, delayed one-quarter bit time by a Delay unit 65. Due to the one-quarter bit time delay in OR unit 63, one of these word pulses will always appear at the output terminal of that unit at T½. The first (least significant) bit of any input number applied to the decoder is at terminal 49 at T0, and since AND unit 51 and OR unit 55 each introduces a one-quarter bit time delay, such a bit reaches the output of OR unit 55 at T½. The least significant bit of any input number therefore emerges from OR unit 55 at the same time as the zero word pulse emerges from OR unit 63. Completing the rest of this part of the circuit, the output of AND unit 57 is connected to the blocking terminal of an Inhibit unit 67 which has its input terminal connected to the output terminal of OR unit 59.

This arrangement constitutes a binary subtractor, borrow pulses appearing at the output of Delay unit 62 and the bits of the difference of subtrahend and minuend appearing serially at the output of Inhibit unit 67. The subtrahend is the delayed zero word pulse applied to OR unit 63, and serves as a "1" bit occurring simultaneously with the least significant bit of the minuend (which is the number appearing at the output of OR unit 55). As indicated, the latter will initially be the input number from the computer. If the first (least significant) bit of the input number is a "1" it will block Inhibit unit 61. Hence, no borrow pulse will be produced. Such a bit will also energize one terminal of AND unit 57. The other terminal will be simultaneously energized by the pulse produced at the output of OR unit 63, so that a "1" will appear at the output of AND unit 57 and will block Inhibit unit 67. This represents a "0" binary difference bit. Inasmuch as the binary difference (1—1) is zero with zero borrow, this is the arithmetically correct result. If the first bit of the input number should be "0," one terminal of AND unit 57 will not be energized and so Inhibit unit 67 will not be blocked. The pulse at the output of OR unit 63 passing through OR unit 59 will also pass through Inhibit unit 67 and a difference bit of "1" will result. The absence of an output pulse from OR unit 55 will result in no pulse at the blocking terminal of Inhibit unit 61, so that the pulse produced at the output of OR unit 63 will also pass through Inhibit unit 61 and Delay unit 62 and result in a borrow pulse. Since the binary difference (0—1) is one with a borrow of one, this also is the arithmetically correct result.

If a borrow pulse occurs it will reach the output of Delay unit 62 at T1. From there it passes through Delay unit 64 and arrives at the input to OR unit 63 at T1¼, emerging at T1½. At T1 the second bit of the input number arrives at input terminal 49. It emerges from OR unit 55 at T1½. If there were no borrow pulse, no pulse would be produced at the output of OR unit 63, and so no pulse would emerge from Inhibit unit 61 regardless of the nature of the output from OR unit 55 at this time. Another zero borrow would therefore result, so that it is evident that that once a zero borrow occurs all succeeding borrows will be zero. In addition, the absence of an output pulse from OR unit 63 will mean that no pulse can traverse AND unit 57, and so Inhibit unit 67 will be continuously conductive. Hence, all remaining bits of the input number will pass through OR unit 59 and Inhibit unit 67 and will constitute the remaining bits of the difference. On the other hand, if the initial borrow had been a one, the situation would be the same as it was when the first fit of the input number occurred, and the subtractor will operate in the manner already described.

It is apparent that borrow pulses will be produced so long as the successive bits of the number emerging from OR unit 55 are zero, but will stop at the first bit which is a "1." As a result, a borrow pulse can only occur at the output of Delay unit 62 at T8 (which would be in response to the eighth and last bit of the input number), when the input number is zero.

The first bit of the difference number produced by the subtractor at the output of Inhibit unit 67 occurs there at T1, since it must pass through four logic units each adding a quarter bit delay. The eighth bit of the difference appears there at T8. A seven bit time Delay unit 69 is connected in a feedback loop between the output terminal of Inhibit unit 67 and the input terminal of Inhibit unit 53. Therefore the first bit of the difference arrives at the input terminal of Inhibit unit 53 at T8. The eighth bit of the difference reaches the input terminal of Inhibit unit 53 at T15. The difference number therefore passes through Inhibit unit 53 and appears at the output of OR unit 55 in the same timing relationship as the input number did in the first subtraction operation of the decoder. The zero word pulse is produced by program unit 45, and a second subtraction operation repeats in a manner identical to that described above. Thus, a continuous subtractive loop is established, each circulation of a number through the loop requiring eight digit times, and each circulation resulting in subtraction of a "1" bit from the least significant bit of the preceding difference. W.P. 0 marks the instant of initiation of each such circulation, and $2^8$ circulations constitute one complete decoding cycle.

To utilize the foregoing subtractor and subtractive loop to generate output pulses of a duration proportional to the input number being decoded, a switching circuit 70 is connected to both of those circuits. This has an input terminal 71 connected to the output of delay unit 62 and an input terminal 73 connected to the output of Inhibit unit 67. In switching circuit 70, terminal 73 is connected to the blocking terminal of an Inhibit unit 75 connected at its output to the set 1 terminal of a Memory unit 77. The input terminal of Inhibit unit 75 is actuated by cycle pulses from program unit 45, to which it is connected through a nine bit time Delay unit 76. The first cycle pulse is produced by program unit 45 at the same time as the read pulse described above. It is, therefore, coincident with W.P. 7, and occurs one bit time before the zero word pulse time at which the input number from the computer reaches decoder input terminal 49. One bit time of the nine bit time delay introduced by unit 76 delays the cycle pulse to the same time position (T0) as the first bit of the input number at terminal 49. The remaining eight bits of delay cause the cycle pulse to reach the input of Inhibit unit 75 simultaneously with the occurrence at the blocking terminal of that unit of the eighth (most significant) bit of the difference number produced at the output of Inhibit unit 67 after the first traverse of the input number through the subtractor. This is at T8. As explained hereinafter, this simultaneity is essential to proper operation of the switching circuit.

With regard to the repetition rate of the cycle pulses, it has been stated above that a time interval of $8\times2^8=2048$ microseconds is required for the cyclic subtraction operations to regenerate an input number. At those intervals the entire decoding cycle repeats. Hence, the cycle pulses must recur 2048 microseconds apart, or equivalently, at a repetition rate of 505 cycles per second.

The other input terminal 71 of switching circuit 70 is connected to one input terminal of an Inhibit unit 79 and one input terminal of an AND unit 81. A second input terminal of Inhibit unit 79 and the other input terminal of AND unit 81 are each supplied with the zero word pulse from program unit 45. The blocking terminal of Inhibit unit 79 is connected through a one-half bit time Delay unit 82 to the output of Memory unit 77. The output of Inhibit unit 79 is connected to the set 1 terminal of a Memory unit 83. The set 0 terminal of that unit is connected through a one-quarter bit time Delay unit 84 to the output of Delay unit 76. Memory unit 83 is connected at its output terminal to a negative current switch 87 and actuates the switch when it is producing output pulses. Memory unit 77 is connected at its output terminal to a positive current switch 89, which it actuates when it is producing output pulses. The construction of these current switches is described below. At this point it is sufficient for an understanding of the operation of the decoder to state that when actuated they each produce constant current of equal magnitudes and of the indicated polarity with respect to ground when actuated. The current switches are connected in parallel to an output terminal 91. Across a load connected to terminal 91, which may be represented by a resistor 93, will be developed a voltage of the kind described above with reference to Fig. 5, representing the magnitude and polarity of the input number decoded.

The function of the switching circuit is to detect the sign of an input number to the decoder and to then properly set the current switches. Also, it detects when the subtractor has reduced the input number to zero and then resets the current switches. In connection with sign detection, if the input number to be decoded is unity the number and its complement are both unity. The decoded voltage will thus have the correct magnitude no matter whether the number is treated as positive or negative. With regard to the polarity of the decoded voltage, unity is a transition value and can be treated as being either positive or negative. This can be understood by considering that if a succession of negative numbers of decreasing magnitude are produced by the computer feeding the decoder, on reaching the value minus "one" the next input number from the computer will be positive. Likewise, if a succession of positive numbers of increasing magnitude are being produced by the computer, on reaching the value plus "one" the succeeding number will be negative.

For example, in a servo loop controlling a shaft, a computer output of "one" would mean that the shaft is 180 degrees from the desired position because "one" is the maximum quantity the computer can produce and a 180 degree error is the maximum error that can be encountered. That position can therefore be reached just as rapidly by rotating the shaft in either direction. If the computer is being used in conjunction with a metering device for displaying the deviation from a desired null value of a continuously variable quantity being measured, a computer output of "one" would correspond to the maximum scale reading on the meter. Therefore, the next output number from the computer would necessarily be smaller in magnitude. If the maximum reading had been approached through a series of numbers of increasing magnitude, representing increasing deviation from the null value, a computer output of "one" would represent maximum deviation in the positive direction. A still further deviation in the same sense would result in a negative computer output of magnitude less than "one," meaning that the deviation of the measured quantity from the null value has been reduced but is now in the opposite direction. It is therefore evident that no matter from what direction the value "one" is approached, the next computer measurement will result in a change in sign. Hence, the value "one" may itself be regarded as representing a change in sign.

In the decoder of Fig. 6 it is most convenient to treat the value "one" as a positive quantity, because the sign of an input number to the decoder is detected after one subtraction operation, and the subtraction of a "one" from the least significant place of the binary number 1.0000000 results in a difference number having a zero in the most significant place. This indicates a positive quantity. Treating "one" as positive avoids the need of special circuitry to detect its sign.

In operation of the switching circuit, the last bit of the first difference produced by the subtractor after application of an input number to terminal 49 appears at terminal 73 at T8. This is the most significant bit of the difference, and will be "1" if the input number was negative and zero if the input number was positive. This bit is applied to the blocking terminal of Inhibit unit 75 at the same time as a pulse is applied to its input terminal from Delay unit 76. Assume first that the input number to be decoded is positive. Then Inhibit unit 75 will produce an output pulse which puts Memory unit 77 into its set 1 state, whereby it produces a series of output pulses. This actuates positive current switch 89, and results in production of a positive output voltage at terminal 91. As explained above, when the number in the subtraction loop has been reduced to "0" a borrow pulse will occur at the output of Delay unit 62 at T8. This pulse will be simultaneous with the zero word pulse constantly being applied to AND unit 81, and will result in an output pulse from that unit which, applied to the set 0 terminal of Memory unit 77, turns it off. No pulse can pass through Inhibit unit 79 at this time since Delay unit 82 stores the last output pulse from Memory unit 77 for one-half bit time, and another one-half bit time delay is produced by the inherent one-quarter bit time delays in AND unit 81 and Memory unit 77. Consequently, a pulse is maintained at the blocking terminal of Inhibit unit 79 all during the interval the borrow pulse and word pulse exist. It is to be noted that the cycle pulse which resulted in Memory unit 77 being put in the set 1 state also causes Memory unit 83 to be simultaneously put in the set 0 state. Delay unit 84 in the path to the set 0 terminal of Memory unit 83 introduces the same delay as Inhibit unit 75 does in the path to the set 1 terminal of Memory unit 77. Hence only one of Memory units 77 and 83 can be in the set 1 state at any particular time.

If the input number to the decoder is negative at T8, a pulse will be present at the blocking terminal of Inhibit unit 75. Therefore, no output pulse is produced in response to the cycle pulse applied to that unit. Memory unit 77 remains in the set 0 state, which is always its final condition after any complete decoding operation, until a new decoding operation begins. The cycle pulse causes Memory unit 83 also to be set to zero. Hence, neither of current switches 87 and 89 are energized. When the number in the subtractive loop has been reduced to zero a borrow pulse will occur at T8. This, together with the zero word pulse, results in an output pulse from Inhibit unit 79 which puts Memory unit 83 in the set 1 state, producing a train of pulses. Negative current switch 87 is therefore actuated, and a negative output voltage is produced at terminal 91. This condition continues until the next cycle pulse occurs, causing Memory unit 83 to be reset to its set 0 state. Due to the timing of the cycle pulses as described, this will be when the input number to the decoder has been regenerated and has gone through one subtraction cycle. The operation of the switching circuit then repeats as just described.

In the event the input number applied to terminal 49 is zero, a borrow pulse will be produced at terminal 71 after the first subtraction operation. In addition, the sign bit at terminal 73 will be "1" because subtraction of a "1" from zero produces a negative difference. The sign bit will block Inhibit unit 75, so that Memory unit 77 will not be actuated. The zero word pulse and the borrow pulse present at the input terminals of Inhibit unit 79 at T8 will produce an output pulse at the set 1 terminal of Memory unit 83 at T8¼. This is because of the one-quarter bit time delay in passing through Inhibit unit 79. However, at T8¼ a cycle pulse reaches the set 0 terminal of Memory unit 83 and that unit will not be actuated. The net result is that the decoder produces a true zero output when the input number applied to it is zero. This characteristic makes it possible to achieve an extremely high degree of accuracy in the positioning of any device controlled in a feedback control system incorporating the decoder.

It is important to note that in the circuit of Fig. 6 no pulses for actuating either of Memory units 77 or 83 are produced until after the first subtraction cycle following application of an input number to the decoder. Then, when the operation of the subtractor has reduced the input number to zero, no pulses for resetting these Memory units are produced until a "1" has been subtracted from the zero entering the subtraction loop. Therefore, the total time during which the Memory units, and consequently current switches 87 and 89, are operated is precisely the time required to reduce the input number to zero. Each output pulse produced at terminal 91 is therefore of precisely correct duration, but occurs one subtraction time later than it would have if Memory units 77 and 83 were set and reset at the respective instants at which the input number is applied to the decoder and is reduced to zero. This fixed time delay, of course, has no effect on either the speed or accuracy of the decoder.

Figure 7:
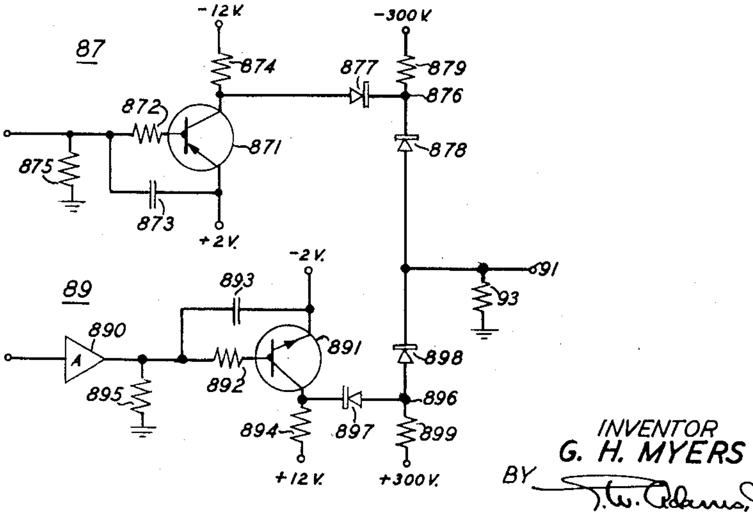
Fig. 7 is a circuit diagram of the current switches employed in the circuit of Fig. 6.

In Fig. 7, there is shown a suitable transistor circuit for performing the functions of current switches 87 and 89 of Fig. 6. Since it is the time during which those switches are actuated which is proportional to the numbers being decoded, and since that duration may be converted to a voltage amplitude, it is necessary that the amplitude of the load current produced by the current switches have a constant value regardless of the load to which it is applied. A convenient way to produce such a current is to utilize a constant amplitude voltage supply connected in series with a sufficiently large resistance relative to any anticipated output load impedances. This combination will behave, substantially, as a constant current source.

Negative current switch 87, for example, may comprise a p-n-p junction transistor 871 having its base connected to the switch input terminal through a resistor 872. The emitter is also connected to the switch input terminal through a condenser 873. The collector is connected to a source of negative direct current potential through a resistor 874. When no positive pulses are applied to the input terminal, the base is held at ground potential by a resistor 875. By applying a small positive D.-C. potential to the emitter, current will flow from the emitter into the base. This causes the collector to emitter impedance of the transistor to become very small and the collector potential becomes nearly equal to the small positive emitter potential. The collector is connected through a diode 877 poled in the low impedance direction to a junction point 876. Connected to junction point 876 is a resistor 879 which, in turn, is connected to a relatively large negative direct current potential. Junction point 876 is additionally connected through a diode 878 poled in the high impedance direction to output terminal 91. Suitable constant current characteristics may be obtained with this circuit by making the resistance of resistor 879 about 150 times that of the largest anticipated load impedance 93.

Due to the foregoing resistance relation, the most negative possible potential of junction point 876, which exists when diode 877 is not conducting, may be made only a few volts. However, when the emitter of transistor 871 is conductive the positive potential of the collector exceeds that of junction point 876 and diode 877 is rendered conductive. Since there is negligible voltage drop across diode 877 the potential of junction point 876 will be a small positive value approximating that of the collector of transistor 871. This biases diode 878 in the reverse direction, rendering it nonconductive. The voltage drops in resistors 874 and 879 absorb the remaining net voltage in the loop comprising them and diode 877. Since diode 878 is nonconductive, the output voltage at terminal 91 is then zero.

If a train of positive pulses is now applied to the input terminal of current switch 87, as from a Memory unit, condenser 873 will charge. The latter will discharge only slightly in the intervals between successive pulses, the discharge path being through resistor 875 to ground. A substantially constant positive direct current potential thereby results at the base of transistor 871. A typical amplitude of the pulses produced by a Memory unit is four volts. If the D.-C. potential supplied to the emitter is smaller than this, the base of transistor 871 will be driven positive relative to the emitter. This causes the emitter to collector impedance to become very high, resulting in a collector potential approximately equal to the negative D.-C. potential supplied to it. Since the maximum negative potential of junction point 876 is smaller than that, diode 877 is rendered nonconductive. Junction point 876 therefore does assume its maximum negative value and diode 878 is rendered conductive. A constant negative output voltage is then produced across load 93 connected to terminal 91.

Positive current switch 89 is analogous to negative current switch 87, except that the transistor 891 in this switch corresponding to transistor 871 in switch 87 is of the n-p-n junction type. This requires a reversal of circuit voltage polarities and of the directions of connection of the polarity sensitive diodes. Consequently, the emitter and collector of transistor 891 are respectively connected to small negative and larger positive direct current potentials, diodes 897 and 898 are reversed in direction relative to diodes 877 and 878 in current switch 87, and junction point 896 is connected to a source of relatively large positive direct current potential. In addition, this circuit will require a train of negative pulses rather than positive pulses. Since Memory units of the type described above with reference to Fig. 6 provide a train of positive pulses, an inverting amplifier 890 is interposed between the input terminal of switch 89 and the balance of the circuit. Amplifier 890 may be of any conventional design, and is conveniently a transistor amplifier having one or a greater odd number of cascaded grounded emitter stages. The output of this amplifier constitutes a virtual input terminal to switch 89 corresponding to the actual input terminal of switch 87. Corresponding components of these switches have been denoted by the same last digit in their reference numbers in Fig. 7.

In the absence of applied pulses, the base of transistor 891 is positive relative to the emitter. The collector to emitter impedance is therefore low, and the collector potential is a few volts negative. The potential of junction point 896 is then also a few volts negative. Diode 898 is cut off, and zero output voltage is produced at terminal 93. If a train of positive pulses from a Memory unit is applied to the input terminal of the switch, amplifier 890 inverts them to a train of negative pulses. Condenser 893 will charge in response to each pulse and discharge only slightly between pulses through resistor 895. A substantially constant negative direct current potential is produced at the base of the transistor, rendering the base negative relative to the emitter. This causes the emitter to collector impedance to become very high, with a resultant positive collector voltage. The maximum positive potential of junction point 896, which exists when diode 897 is nonconductive, is only a few volts. As a result diode 897 is rendered nonconductive, and the potential of that junction point does become a few volts positive. Diode 898 is therefore conductive, and a constant positive output voltage is produced across load 93 connected to terminal 91.

As stated previously, in the circuit of Fig. 6 the computer must feed input numbers to the decoder only at those instants at which the decoder has just finished a complete decoding operation. The computer must be programmed to provide new input numbers to the decoder at intervals which are integral multiples of the maximum time of one decoding cycle, or 2048 microseconds in the specific numerical example chosen. Consider, for example, that a computer with which it is desired to use the decoder operates at some integral multiple, say five, of the decoder cycle time. It would then be a simple matter to connect five decoders to the computer, and for the program unit to successively gate each at five times the cycle pulse repetition rate. Each decoder would then have completed one decoding cycle before a new number is provided to it from the computer for decoding. In each decoder, a read pulse would occur at the same time as one of the cycle pulses. If ten decoders were so utilized, each could obviously complete two cycles before being required to handle a new input number. The overall simplicity and reliability of the decoder described with reference to Fig. 6 make it very convenient to utilize several of them in this manner in conjunction with a single computer programmed to compute successively different quantities each of which must be decoded.

When the computer provides new numbers for decoding at a nonintegral multiple of the decoder cycle time, it is necessary to interpose means between the computer and the decoders which accepts numbers at the computer rate, momentarily stores them, and then feeds them to the several decoders at times coincident with completion of the decoding cycles of the respective decoders. Such means are well known in the art as "buffer registers" and are most commonly used between computers and the relatively slow input and output devices available at the present state of the computing art. An arrangement of this kind is shown in Fig. 8.

Figure 8:
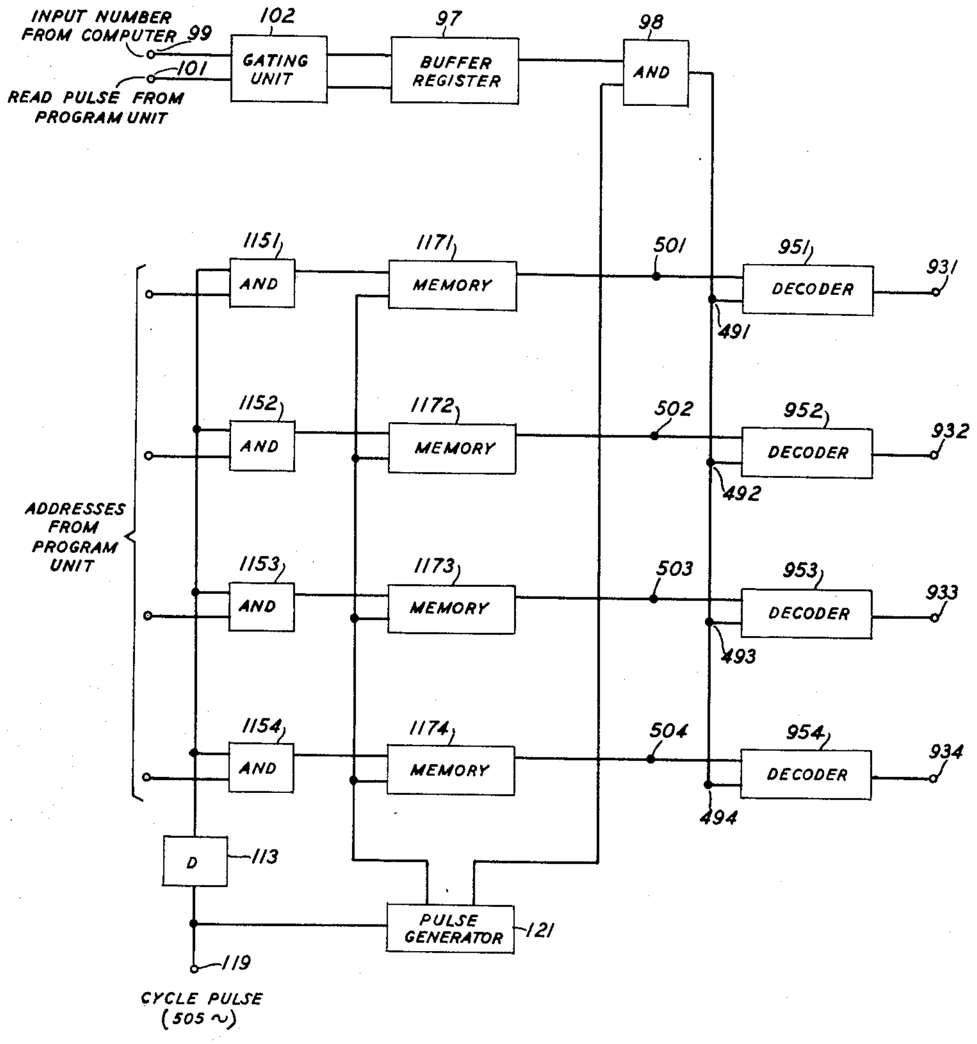
Fig. 8 is a logic circuit diagram of means for utilizing a plurality of decoders constructed in accordance with the invention in conjunction with a single computer which provides digital control signals at any desired rate.

The circuit of Fig. 8 includes four decoders 951 through 954 which are supplied from a computer which successively produces four new input numbers at the rate of twenty each per second. Each decoder is of the type described above with reference to Fig. 6, and with the typical operating conditions stated requires 2048 microseconds to complete one decoding cycle. If all four operate simultaneously, accepting input numbers in succession, each will be required to accept a new input number every $\frac{1}{20}$ of a second. Hence each decodes an input number applied to it 24 times before it is called on to accept another input number. It should be noted that a rate of 20 inputs per second is not an integral factor of the decoding rate of 505 cycles per second corresponding to 2048 microseconds. Nonetheless, the circuit of Fig. 8 adjusts for this difference as will now be described.

When the computer program requires decoding of a particular number produced by the computer at terminal 99 the computer program unit (not shown) which controls the timing of all computer operations produces a read pulse simultaneously with a particular word pulse. The program unit may be of the type described previously, and applies the read pulse to terminal 101. This terminal is connected to a gating unit 102, which in response to the read pulse gates the buffer register 97, admitting into it the number at input terminal 99 from the computer. Buffer register 97 may be of the recirculatory type comprising an amplifier with its output returned to the input through a delay line which retards return of the first bit of the output to the input until the last bit of the input has entered the amplifier. This type of register is well known, being described for example, on pages 1394 through 1397 of the October 1953 issue of the "Proceedings of the Institute of Radio Engineers," volume 41, No. 10 (Computer Issue).

The essential characteristic of gating unit 102 is that in response to a read pulse it admits all eight bits of the number at terminal 99 while blocking the recirculatory loop of the register, and then blocks terminal 99 while permitting the new bits in the delay line to recirculate. The portion of the circuit of Fig. 6 comprising Memory unit 46, Delay units 47 and 48, and the switch comprising Inhibit unit 53 and AND unit 51 is illustrative of a suitable gating unit of this kind. To read out a number in buffer register 97 a simple AND unit 98 may be connected to the register. Application of a series of eight pulses to AND unit 98 starting at the instant the first of the eight pulses in the number stored in register 97 appears at the register output will gate the number out.

As stated previously, the first bit of any input number enters buffer register 97 coincidentally with a predetermined word pulse. This does not require any synchronism with the computer beyond that normally required, since the time in the program cycle at which the results of any calculation appear at a given point in the computer circuit must be precisely established in order to permit proper timing of all computer operations. It is the function of the program unit to establish these times. Consequently, by including appropriate Delay units in the buffer register, it is possible to arrange that the first bit of a recirculating number always arrives at AND unit 98 simultaneously with W.P. 7¾. If the latter unit is gated with eight pulses starting at W.P. 7¾, the number in register 97 is gated out over the interval from W.P. 0 to W.P. 7. These gating pulses are provided by pulse generator 121, connected to one input terminal of AND unit 98, when actuated by a cycle pulse from the program unit. Generator 121 may comprise a Memory unit with a delayed feedback path which sets it to zero after producing eight pulses. The portion of the circuit of Fig. 6 comprising Memory unit 46 and Delay units 47 and 48 is illustrative of a suitable arrangement of this type. The cycle pulse is supplied to generator 121 at terminal 119, and is generated by the program unit. This is the same cycle pulse as is supplied to the decoder described in Fig. 6. The delay introduced by generator 121 may be such that its first output pulse occurs simultaneously with W.P. 7¾. This is the required timing condition, as already described. The cycle pulse may also be supplied to each of decoders 951 through 954, in accordance with the above description of the decoder in Fig. 6.

The remainder of Fig. 8, comprising AND units 1151 through 1154 and Memory units 1171 through 1174, is an address circuit included for the purpose of permitting selection of any one of decoders 951 through 954 to receive the next number in buffer register 97. Each time the program unit provides a read pulse to terminal 101 it also applies either a steady potential or a series of pulses to one input terminal of a selected one of AND units 1151 through 1154. Thus the first and every fourth succeeding read pulse may be accompanied by application of a pulse series to AND unit 1151, the second and every fourth succeeding read pulse by application of a pulse series to AND unit 1152 and termination of the series applied to the preceding AND unit, etc. Alternatively, a more irregular order of selection may be utilized, or the same AND unit may be actuated after only one or two other AND units have been actuated. Any desired order of selection may be established by the counters in the program unit together with appropriate gating and Memory units, using techniques well known in the art. The other input terminal of each of AND units 1151 through 1154 is connected through a Delay unit 113 to terminal 119, so that each AND unit receives each cycle pulse. Each AND unit is connected at its output to the set 1 terminal of the one of Memory units 1171 through 1174 having the same last reference numeral. The set 0 terminals of all Memory units are connected to the terminal of pulse generator 121 at which is produced the pulse which turns that generator off after having produced eight gating pulses at its other terminal in response to a cycle pulse. The output terminal of each Memory unit is connected to the input terminal of the one of decoders 951 through 954 having same last reference numeral. These input terminals are at points 491 through 494 for decoders 951 through 954 respectively, each corresponding to input terminal 49 of the decoder described in detail above with reference to Fig. 6. The decoder gating terminals 501 through 504 correspond to gating terminal 50 of the decoder in Fig. 6, and are all connected to the output of AND unit 98. At the decoder output terminals 931 through 934 will be produced the decoded output voltages corresponding to the numbers in the particular decoders at any time.

In operation, when the computer is ready to supply an input number to be decoded the program unit applies a read pulse to terminal 101. Gating unit 102 thereby admits the input number to buffer register 97, and by blocking the recirculatory loop of the register while the number is being admitted obliterates the number formerly in the loop.

The program unit also begins applying a series of pulses to a selected one, say unit 1152, of AND units 1151 through 1154. The number inserted into the buffer register continues to circulate therein. When the first cycle pulse following the read pulse occurs, it actuates pulse generator 121. This begins production of the series of eight pulses which, applied to AND unit 98, gate the eight bits of the number in register 97 out through that AND unit. As described, all timing relationships are such that the first bit emerges at the time of W.P. 0. This and the ensuing seven bits are applied to each of decoder input terminals 491 through 494. As explained above with reference to Fig. 6, a number at the input terminal of any decoder cannot enter unless the decoder gating terminal is also actuated. The cycle pulse, in the meantime, also propagates through Delay unit 113 and reaches one input terminal of each of AND units 1151 through 1154. Since AND unit 1152 is then the only one having both input terminals energized, it alone produces an output pulse. Memory unit 1172 is therefore pulsed to its set 1 state and applies a series of pulses to decoder gating terminal 502. The first such pulse arrives at the time of W.P. 0, Delay unit 113 introducing sufficient delay to establish this condition.

As a result, decoder 952 is supplied with a gating pulse at the instant the first bit of a new input number arrives and both events occur at W.P. 0. As described above with reference to Fig. 6, W.P. 0 marks the instant at which each decoder may begin a new decoding cycle, so that the decoding of a number formerly in decoder 952 is completed just as the new input number enters. After all bits of the new input number have entered decoder 952, pulse generator 121 ceases gating AND unit 98 and no further bits can enter even if such should be present in buffer register 97. Also, the pulse which turns off pulse generator 121 is applied to the set 0 terminal of Memory unit 1172, turning that unit off.

All decorders will now continue to decode whatever numbers have been placed in them, nothing further happening until the next read pulse and input number occur at terminals 101 and 99 respectively. Cycle pulses do, of course, continue to recur at a regular rate. However, since none of AND units 1151 through 1154 is addressed by the program unit until the next read pulse, the cycle pulses cannot actuate any of gating terminals 501 through 504, and so do not affect the decoders. The next read pulse, however, results in entry of a new number into the buffer register and also prepares conditions as stated so the next following cycle pulse reads the new number into one of the decoders.

The arrangement of Fig. 8 utilized four decoders. It is apparent that any number of decoders could be used, as well as only a single decoder in the case where a buffer register is necessary because input numbers are supplied at other than an integral multiple of the decoder cycle time.

Specific logic circuits were described in explaining the construction and mode of operation of the invention. However, it will be apparent to those skilled in the art that many other circuit configurations serving the same function may be utilized and would still come within the spirit and scope of the invention. For example, the binary subtracting circuit described differs only slightly in a logical sense from a binary adder, so that the invention may be easily adapted to function on an additive rather than a subtractive basis.

What is claimed is:

1. A decoder for defining a series of successive time intervals which are each proportional to the decimal value of the number represented by a supplied group of pulses in a cyclic numerical code, comprising the combination of arithmetic means adapted to produce an output pulse code group a fixed time interval after any pulse code group is applied thereto, each such output pulse code group representing a number in said code which differs by a predetermined increment from the number represented by the applied pulse code group, gating means connected to said arithmetic means for applying said supplied pulse code group thereto, a recirculatory loop connected to said arithmetic means through said gating means for reapplying thereto each output pulse code group produced thereby after a time delay at least equal to said fixed time interval, detecting means connected to said arithmetic means for producing a borrow pulse each time an output pulse code group produced thereby represents a preselected reference number in said code, programming means including means for producing a series of control pulses substantially coincident with the successive pulses in said supplied pulse code group, means applying the control pulses from said programming means to said gating means to disable said recirculatory loop and to permit application of said supplied pulse code group to the arithmetic means, said programming means also producing cycle pulses at intervals equal to the intervals at which said arithmetic means produces successive output pulse code groups representing identical numbers in said code, and switching means connected to said detecting means and to said programming means, said switching means having at least two stable operating states between which it is adapted to alternate in response to successively interspersed ones of said borrow and cycle pulses, whereby the successive time intervals during which said switching means is in a particular one of its operating states are each proportional to the decimal value of the number represented by said supplied group of pulses.

2. A decoder for defining a series of successive time intervals which are each proportional to the decimal value of the number represented by a supplied pulse code group in a cyclic numerical code, the maximum positive and maximum negative numbers in said code being the same and negative numbers being expressed as complements of the modulus of the code, comprising the combination of arithmetic means having an input terminal and an output terminal, said arithmetic means being adapted to produce an output pulse code group at its output terminal a fixed time interval after any pulse code group is applied to its input terminal, each such output pulse code group representing a number in said code which differs from that represented by the preceding applied pulse code group by the smallest incremental number in said code, gating means connected to the input terminal of said arithmetic means for applying said supplied pulse code group thereto, a recirculatory loop connecting the output terminal of said arithmetic means through said gating means to its input terminal for reapplying each output pulse code group produced by said arithmetic means to the input terminal thereof after a time delay at least equal to said fixed time interval, zero detecting means connected to said arithmetic means for producing a borrow pulse whenever an output pulse code group produced thereby represents the number zero in said code, programming means including means for producing a series of control pulses substantially coincident with the successive pulses in said supplied pulse code group, means applying the control pulses from said programming means to said gating means to disable said recirculatory loop and to permit application of said supplied pulse code group to the arithmetic means, said programming means also producing cycle pulses at intervals equal to the intervals at which said arithmetic means produces successive output pulse code groups representing the same number in said code as that represented by said supplied pulse code group, and switching means connected to said zero detecting means and to said programming means, said switching means having at least two stable operating states between which it alternates in response to successively interspersed ones of said borrow pulses and cycle pulses, whereby the successive time intervals during which said switching means remains in a particular one of its operating states are each proportional to the decimal value of the number represented by said supplied pulse code group.

3. A decoder for defining a series of time intervals which are each proportional to the decimal value of the number represented by a supplied pulse code group in a cyclic numerical code, the maximum positive and maximum negative numbers in said code being the same and negative numbers being expressed as complements of the modulus of the code, comprising the combination of subtracting means adapted to produce an output pulse code group a fixed time interval after any pulse code group is applied thereto, each such output pulse code group representing a number in said code which is less than the number represented by the applied pulse code group by the smallest incremental number in said code, gating means connected to said subtracting means for applying said supplied pulse code group thereto, a recirculatory loop connected to said subtracting means through said gating means for reapplying thereto each output pulse code group produced thereby after a time delay at least equal to said fixed time interval, zero detecting means connected to said subtracting means for producing a borrow pulse each time an output pulse code group representing the number zero is produced thereby, programming means including means for producing a series of control pulses substantially coincident with the successive pulses in said supplied pulse code group, means applying the control pulses from said programming means to said gating means to disable said recirculatory loop and permit application of said supplied pulse code group to the subtracting means, said programming means also producing cycle pulses at intervals equal to the intervals at which said subtracting means produces successive output pulse code groups representing the same number in said code as that represented by said supplied pulse code group, sign detecting means connected to said subtracting means and to said programming means for producing a sign-indicating signal in response to each cycle pulse which occurs when an output pulse code group representing a number having a predetermined arithmetic sign in said code is produced by said subtracting means, switching means having a quiescent operating state and two opposite active operating states, means for connecting said switching means to said zero detecting means, to receive said borrow pulses, means for connecting said switching means to said sign detecting means to receive said sign-indicating signals, and means for connecting said switching means to said programming means to receive said cycle pulses, said switching means being adapted to alternate between its quiescent operating state and a selected one of its two active operating states in response to successively interspersed ones of said borrow pulses and said cycle pulses, a first of said two active operating states being so selected when said sign-indicating signals occur and the second of said two active operating states being so selected when said sign-indicating signals do not occur, whereby the successive time intervals during which said switching means remains in a selected one of its active operating states is proportional to the decimal value of the number represented by said supplied pulse group, and the one of said active operating states so selected corresponds to the arithmetic sign of that number.

4. The decoder of claim 3, wherein said switching means more specifically comprises a pair of output channels each of which has a quiescent operating state and an active operating state, said switching means being adapted to cause a selected one of said channels to assume its active operating state for a time determined by the interval between successively interspersed ones of said cycle pulses and said borrow pulses, the first of said channels being so selected when said sign-indicating signals occur and the second of said channels being so selected when said sign-indicating signals do not occur.

5. A decoder for defining a series of time intervals which are each proportional to the decimal value of a supplied number in a cyclic binary code wherein all numbers comprise a fixed number of bits occurring serially in order of increasing significance, and wherein subtraction of the smallest incremental code bit from an initial number only results in a larger difference number when the initial number is zero, comprising a binary subtractor having an input terminal and an output terminal, said subtractor being constructed and arranged to subtract the smallest incremental code bit from any number applied to its input terminal and to produce the resultant difference number at its output terminal after a fixed time delay, a recirculatory loop for connecting the output terminal of said subtractor to its input terminal, said recirculatory loop including delay means through which each number produced at the output terminal of said subtractor is reapplied to its input terminal after an interval at least as long as said fixed time delay, gating means connected to the input terminal of said subtractor for completing the path of said recirculatory loop therethrough and for initially applying said supplied number thereto, a borrow pulse loop connected to said subtractor for producing a borrow pulse each time said subtractor produces a difference number at its output terminal in response to application of the number zero to its input terminal, programming means including means for producing a series of control pulses substantially coincident with the successive pulses in said supplied number, means applying the control pulses from said programming means to said gating means to disable said recirculatory loop and permit application of said supplied pulse code group to the subtractor, said programming means also producing cycle pulses at intervals equal to the intervals at which said subtractor produces successive difference numbers at its output terminal the same as the difference number produced in response to said supplied number, and switching means connected to said borrow pulse loop and to said programming means, said switching means having at least two stable operating states between which it alternates in response to successively interspersed ones of said borrow pulses and said cycle pulses, whereby each of the successive time intervals during which said switching means remains in a particular one of its operating states is proportional to the decimal value of said supplied number.

6. A decoder for producing a series of voltages which each have a duration proportional to the decimal value of a supplied group of pulses representing a number in a predetermined cyclic numerical code, comprising subtracting means having an input terminal and an output terminal, said subtracting means being adapted to produce a difference pulse code group at its output terminal a fixed time delay after any pulse code group is applied to its input terminal, each such difference pulse code group representing a number in said code which is less than the number represented by the preceding pulse code group applied to the input terminal by a predetermined increment in said code, gating means connected to the input terminal of said subtracting means for applying said supplied pulse code group thereto, a recirculatory loop for connecting the output terminal of said subtracting means through said gating means to its input terminal, said recirculatory loop being adapted to reapply each difference pulse code group produced at the output terminal to the input terminal as an input pulse code group after an interval at least equal to said fixed time delay, programming means including means for producing a series of control pulses substantially coincident with the successive pulses in said supplied pulse code group, means applying the control pulses from said programming means to said gating means to disable said recirculatory loop and permit application of said supplied pulse code group to the subtracting means, said programming means being further adapted to produce cycle pulses at intervals equal to the intervals at which said subtracting means produces successive difference pulse code groups representing the number which is less than that represented by said supplied pulse code group by said predetermined increment in said code, zero detecting means connected to said subtracting means and to said programming means, said zero detecting means being adapted to produce a borrow pulse in response to each control pulse which occurs coincident with production by said subtracting means of a difference pulse code group representing the number in said code which is said predetermined increment less than zero, first and second switching means each constructed and arranged to be set in either of two states, means for applying said cycle pulses and said borrow pulses to each of said switching means, said first switching means being adapted to assume its first state in response to each of said cycle pulses and to assume its second state in response to each of said borrow pulses, said second switching means being adapted to assume its first state in response to each of said borrow pulses and to assume its second state in response to each of said cycle pulses, voltage generating means connected to each of said switching means for producing an output voltage of one polarity when said first switching means is in its first state and an output voltage of the opposite polarity when said second switching means is in its first state, and means for so interconnecting said first and second switching means that each is prevented from assuming its first state after the other has assumed its first state.

7. A decoder for producing a series of voltages which each have a duration proportional to the decimal value of a supplied group of pulses representing a number in a predetermined cyclic numerical code wherein the maximum positive and maximum negative numbers are the same, and wherein negative numbers are expressed as complements of the modulus of said code, the combination of arithmetic means having an input terminal and an output terminal, said arithmetic means being constructed and arranged so that a fixed time delay after any pulse code group is applied to its input terminal it produces an output pulse code group at its output terminal representing a number in said code which differs from the number represented by the applied pulse code group by the smallest incremental number in said code, gating means connected to the input terminal of said arithmetic means for applying said supplied pulse code group thereto, a recirculatory loop for connecting the output terminal of said arithmetic means through said gating means to the input terminal thereof, said recirculatory loop being adapted to reapply each output pulse code group produced at the output terminal to the input terminal after a time delay at least equal to said fixed time delay, zero detecting means connected to said arithmetic means for producing a borrow pulse each time said arithmetic means produces an output pulse code group representing the number zero, programming means including means for producing a series of control pulses substantially coincident with the successive pulses in said supplied pulse code group, means applying the control pulses from said programming means to said gating means to disable said recirculatory loop and permit application of said supplied pulse code group to the arithmetic means, said programming means also producing cycle pulses at intervals equal to the intervals at which said arithmetic means produces successive identical output pulse code groups, first and second switching means each constructed and arranged to be set in either of two states, means for applying said cycle pulses and said borrow pulses to each of said switching means, said first switching means being adapted to assume its first state in response to each of said cycle pulses and to assume its second state in response to each of said borrow pulses, said second switching means being adapted to assume its first state in response to each of said borrow pulses and its second state in response to each of said cycle pulses, and voltage generating means connected to each of said switching means for producing an output voltage of a first polarity during the intervals when said first switching means is in its first state and an output voltage of opposite polarity during the intervals when said second switching means is in its first state.

8. A binary decoder for producing a series of signal pulses which each have a duration representing the decimal value of a supplied number in a cyclic binary code which includes positive and negative binary numbers, comprising binary subtracting means adapted to repeatedly and at uniform intervals replace any number entered therein with the number obtained by subtracting a fixed incremental number in said code therefrom, first gating means connected to said subtracting means for initially placing said supplied number therein, whereby the number in said subtracting means is cyclically changed from said supplied number to zero and back to said supplied number at a uniform cyclic rate, zero detecting means connected to said subtracting means for producing a borrow pulse each time the number therein is reduced to zero, programming means for producing cycle pulses at intervals equal to the intervals between instants at which the number in the subtracting means is the same as the said supplied number, second gating means connected to said subtracting means and to said programming means, said second gating means being adapted to produce a sign-indicating pulse in response to each of said cycle pulses which occur when the number in said subtracting means has a predetermined arithmetic sign, first bistable switching means constructed and arranged to produce a first continuous output signal when in the first of its two stable states, means for applying said sign-indicating pulses and said borrow pulses to said first switching means, said first switching means being adapted to assume its first operating state in response to each of said sign-indicating pulses and to assume its second operating state in response to each of said borrow pulses, second bistable switching constructed and arranged to produce a second continuous output signal when in the first of its two stable states, means for applying said borrow pulses and said cycle pulses to said second switching means, said second switching means being adapted to assume its first operating state in response to each of said borrow pulses and to assume its second operating state in response to each of said cycle pulses, and means for connecting said first and second switching means so that each is prevented from assuming its first operating state for a minimum interval after the other has assumed its second operating state.

9. A decoder for cyclically producing a series of voltages each having a duration proportional to the decimal value of the number in a cyclic numerical code represented by a supplied pulse code group, comprising subtracting means to which said supplied pulse code group is applied, said subtracting means being constructed and arranged to successively and at equal time intervals generate successive output pulse code groups respectively representative of the successive numbers in said code obtained by successively subtracting a fixed incremental number in said code from the number represented by said supplied pulse code group, zero detecting means connected to said subtracting means for producing a borrow pulse each time said subtracting means produces an output pulse code group representing the number zero in said code, switching means having two stable states, means for connecting said zero detecting means to said switching means to convey said borrow pulses thereto, said switching means being constructed and arranged to assume a first of its stable states in response to each of said borrow pulses, programming means, means for connecting said programming means to said subtracting means and to said switching means, said programming means being adapted to cause said switching means to assume the second of its stable states at uniform intervals equal to the intervals at which said subtracting means produces output pulse code groups representing the same number in said code as that represented by said supplied group of pulses, and voltage generating means connected to said switching means, said voltage generating means being adapted to produce a voltage at a first level of potential when said switching means is in its first state and to produce a voltage at a second level of potential when said switching means is in its second state.

10. A decoder for producing a series of voltages each having a duration and a polarity respectively representing the decimal value and arithmetic sign of a supplied binary number in a cyclic binary code, each digit in said code having either the binary weight "1" or "0," and successive digits of any number being of successively higher binary significance, said decoder comprising binary subtracting means, means for applying said supplied number to said subtracting means, said subtracting means being adapted to produce consecutive output numbers at equal intervals, the first such output number being produced by subtracting a "1" bit of least binary significance from said supplied number and all subsequent output numbers being produced by subtracting a "1" bit of least binary significance from the preceding output number, programming means for producing timing pulses at the same rate as output numbers are produced by said subtracting means, said programming means being further adapted to produce cycle pulses at the same rate as said subtracting means produces successive identical output numbers, positive voltage switching means having "on" and "off" input terminals, said positive voltage switching means being adapted to produce a positive output voltage in response to application of a pulse to its "on" terminal and to terminate that voltage in response to application of a pulse to its "off" terminal, negative voltage switching means having "on" and "off" input terminals, said negative voltage switching means being adapted to produce a negative output voltage in response to application of a pulse to its "on" terminal and to terminate that voltage in response to application of a pulse to its "off" terminal, means for applying said cycle pulses to the "off" terminal of said negative voltage switching means, sign detecting means connected to said subtracting means, means for further connecting said sign detecting means to said programming means to receive said cycle pulses, said sign detecting means being adapted to produce a sign-indicating signal in response to each of said cycle pulses which are received thereby coincident with production of an output number having a first arithmetic sign by said subtracting means, means for applying said sign-indicating signals to the "on" terminal of said positive voltage switching means, zero detecting means connected to said subtracting means, means for further connecting said zero detecting means to said programming means to receive said timing pulses, said zero detecting means being adapted to produce a borrow pulse in response to each of said timing pulses which are received thereby coincident with production of an output number by said subtracting means greater than the immediately preceding output number produced thereby, means for applying said borrow pulses to the "off" terminal of said positive voltage switching means and to the "on" terminal of said negative voltage switching means, and delay means for connecting said positive voltage switching means to the "off" terminal of said negative voltage switching means.

11. In combination with a digital computer which supplies both arithmetically positive numbers and arithmetically negative numbers in a cyclic numerical code, a decoder for producing a series of voltage pulses of which each has a duration and polarity respectively representing the decimal value and arithmetic sign of the number supplied to the decoder by the computer, comprising a program unit adapted to produce a read pulse when said computer supplies a number to be decoded, arithmetic means adapted to receive therein any number in said code and to replace it after a fixed time interval with a number differing therefrom by an incremental number in said code, said replacements occurring repetitively at said fixed time intervals, means responsive to said read pulse for entering said supplied number into said arithmetic means, zero detecting means connected to said arithmetic means for producing a borrow pulse each time the number produced therein differs from zero by said incremental number, said program unit being further adapted to initiate production of a series of cycle pulses when said read pulse is produced, said cycle pulses occurring at uniform intervals equal to the intervals at which successive identical numbers are produced within said arithmetic means, sign detecting means connected to said arithmetic means and to said program unit, said sign detecting means being adapted to produce a sign-indicating pulse in response to each of said cycle pulses which occur when an arithmetically positive number is in said arithmetic means, first and second switching means, means for connecting each of said switching means to said program unit to receive said cycle pulses, means for further connecting each of said switching means to said borrow pulse detecting means to receive said borrow pulses, means for further connecting said first switching means to said second switching means, first and second current sources, means for respectively connecting said sources to said first and second switching means, said first switching means being adapted to actuate said first current source in response to each of said sign-indicating pulses and to de-actuate said first current source in response to each of said borrow pulses, said second switching means being adapted to actuate said second current source in response to each of said borrow pulses and to de-actuate said second current source in response to each of said cycle pulses, and means for so interconnecting said first and second switching means that after one switching means has actuated the current source connected thereto the other switching means is prevented from actuating the current source connected thereto.

12. A decoder for defining a series of successive time intervals each of which is proportional to the decimal value of the number represented by a supplied pulse group in a cyclic numerical code, comprising the combination of subtracting means for receiving pulse groups therein, said subtracting means being constructed and arranged to successively and at uniform intervals replace any pulse group already therein with the pulse group representing the number in said code obtained by subtracting a fixed incremental number in said code from the number represented by the pulse group already therein, gating means connected to said subtracting means for initially placing said supplied pulse group therein, programming means including means for producing a series of control pulses substantially coincident with the successive pulses in said supplied pulse group, means applying the control pulses to said gating means to control the application of said pulse group to said subtracting means, said programming means also producing cycle pulses at the same intervals as the intervals at which successive identical pulse groups are replaced in said subtracting means, zero detecting means connected to said subtracting means for producing a borrow pulse each time the pulse group in said subtracting means represents the number zero in said code, and switching means connected to said zero detecting means and to said programming means for receiving said borrow pulses and said cycle pulses, said switching means having at least two stable operating states between which it alternates in response to successively interspersed ones of said borrow pulses and said cycle pulses, whereby the successive time intervals during which said switching means remains in a particular one of its operating states are each proportional to the decimal value of the number represented by said supplied pulse group.

13. A decoder for defining a series of successive time intervals each of which is proportional to the decimal value of the number represented by a supplied pulse group in a cyclic numerical code, comprising the combination of arithmetic means for receiving pulse groups therein, said arithmetic means being constructed and arranged to successively and at uniform intervals replace any pulse group already therein with the pulse group representing the number in said code which differs by a fixed increment from the number represented by the pulse group already therein, gating means connected to said arithmetic means for initially placing said supplied pulse group therein, programming means including means for producing a series of control pulses substantially coincident with the successive pulses in said supplied pulse group, means applying the control pulses to said gating means to control the application of said pulse group to said arithmetic means, said programming means also producing cycle pulses at the same intervals as the intervals at which successive identical pulse groups are replaced in said arithmetic means, zero detecting means connected to said arithmetic means for producing a borrow pulse each time the pulse group in said arithmetic means represents the number zero in said code, and switching means connected to said zero detecting means and to said programming means for receiving said borrow pulses and said cycle pulses, said switching means having at least two stable operating states between which it alternates in response to successively interspersed ones of said borrow pulses and said cycle pulses, whereby the successive time intervals during which said switching means remains in a particular one of its operating states are each proportional to the decimal value of the number represented by said supplied pulse group.

References Cited in the file of this patent

UNITED STATES PATENTS 2,829,323 Steele ---------------- Apr. 1, 1958